G. KALLNER.
PORTABLE INTERNAL COMBUSTION ENGINE.
APPLICATION FILED SEPT. 12, 1916.

1,325,473.

Patented Dec. 16, 1919.
2 SHEETS—SHEET 1.

Witnesses
F. C. Gibson.

Inventor
G. Kallner.

By Victor J. Evans
Attorney

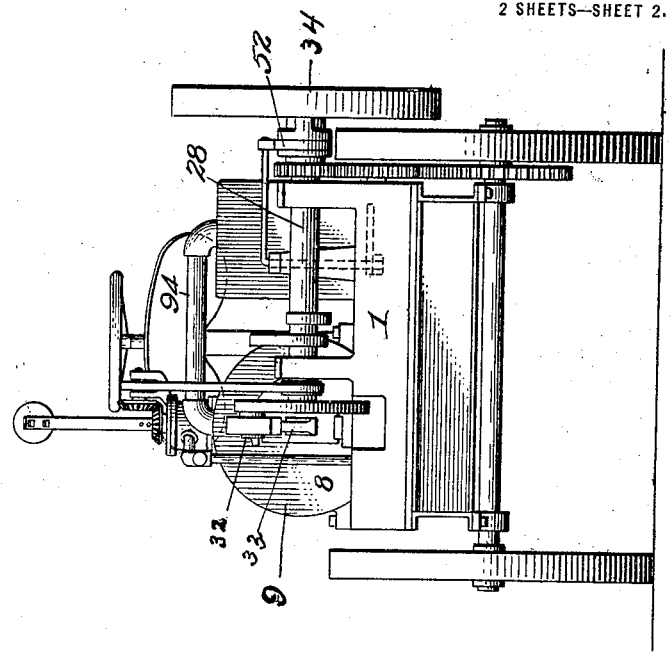

UNITED STATES PATENT OFFICE.

GUSTAVE KALLNER, OF SPRINGVALLEY, ILLINOIS.

PORTABLE INTERNAL-COMBUSTION ENGINE.

1,325,473.  Specification of Letters Patent.  Patented Dec. 16, 1919.

Application filed September 12, 1916. Serial No. 119,716.

*To all whom it may concern:*

Be it known that I, GUSTAVE KALLNER, a citizen of the United States, residing at Springvalley, in the county of Bureau and State of Illinois, have invented new and useful Improvements in Portable Internal-Combustion Engines, of which the following is a specification.

This invention relates to portable internal combustion engines, the object in view being to produce an engine of the character referred to which is adapted to be mounted practically as a whole on a wheeled platform truck, the driving connection between the engine and the truck embodying a train of gears only one of which is connected to the truck proper being fastened to the driving axle thereof. This enables practically the entire engine to be removed from the truck frame and mounted on a stationary base or support whenever found desirable.

Another object of the invention is to provide novel means for throwing the crank shaft of the engine into and out of gear with the driving axle of the truck so that the truck may be propelled by the engine to any desired place and thereafter allowed to remain stationary while the engine may still be utilized for operating machinery of any character.

With the above and other objects in view, the invention consists in the novel construction, combination and arrangement of parts, as herein described, illustrated and claimed.

In the accompanying drawings:—

Fig. 3 is a rear elevation thereof.

Fig. 4 is a front elevation of the same.

Figure 1:
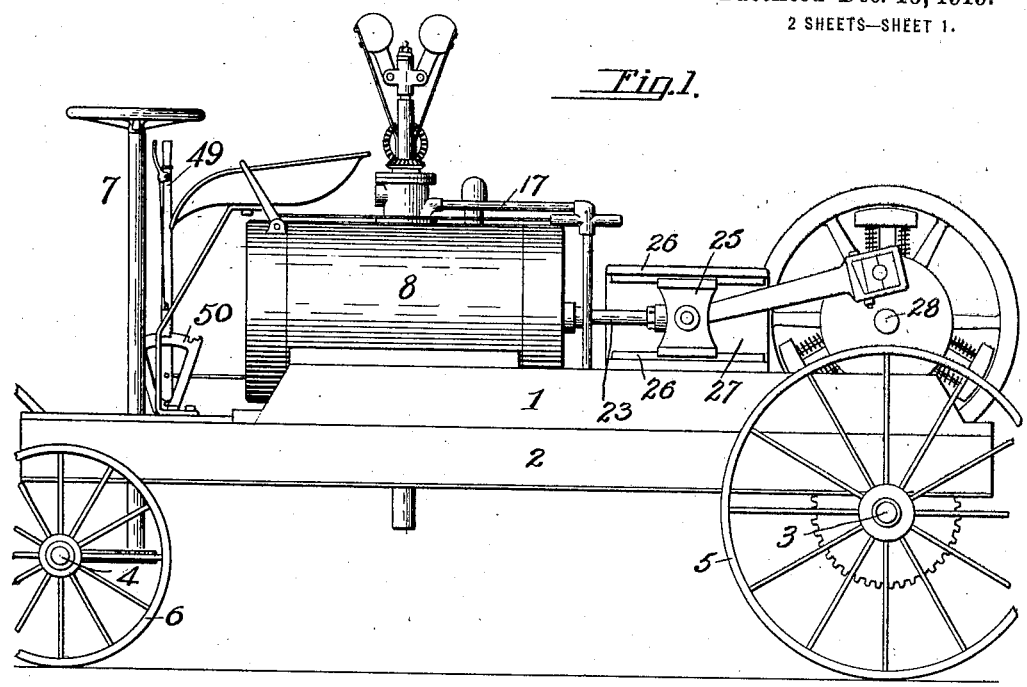
Figure 1 is a side elevation of a complete portable engine embodying the present invention.
Figure 2:
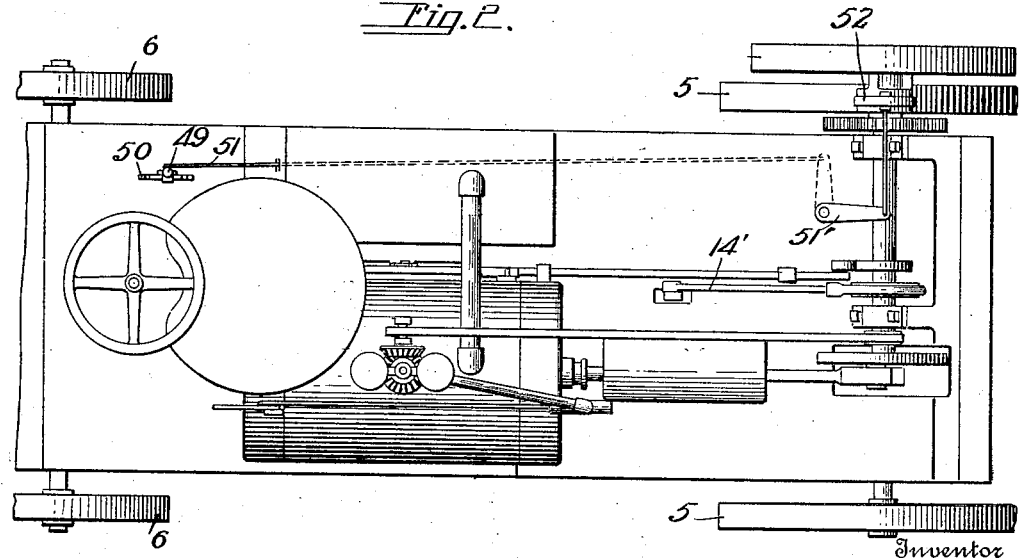
Fig. 2 is a plan view of the same.

The portable engine contemplated in this invention comprises essentially a base 1 which is adapted to be mounted directly upon and secured to the platform 2 of a wheeled truck embodying the rear driving axle 3, the front steering axle 4, the rear traction wheels 5 and the front steering wheels 6, suitable steering mechanism being designated generally at 7 for turning the axle 4 which is pivotally mounted under the platform of the truck.

8 designates the engine cylinder provided at the opposite ends thereof with heads 9. The piston is mounted fast on one end of a piston rod 23 which works through a stuffing box in one of the cylinder heads, the outer end of the rod 23 being connected to a sliding cross head 25 which is mounted between parallel guides 26 on a bearing plate 27 best illustrated in Fig. 1. The crank shaft 28 is journaled in bearings 30 on the base 1. The crank shaft 28 is formed with a single crank, the crank pin 32 of which has connected thereto one end of a pitman or connecting rod 33 the opposite end of which is connected by a pivot to the sliding cross head 25. 34 designates a combined fly wheel and belt wheel which is fastened to the crank shaft 28. The engine 8 may be used either to propel the vehicle upon which it is mounted, or for the purpose of furnishing power for other purposes. To accomplish this there is provided a spur gear 54, which is normally loose on the shaft 28 and is adapted to be locked thereon through the medium of a clutch of suitable character, which may be operated through the medium of a collar 52, which is shiftable by means of a bell crank 51'. This bell crank is operated by means of a thumb latch lever 49, which is pivotally mounted on the machine and coöperates with a rack 50, the lever 49 being connected to the bell crank 51' by means of a rod 51.

The gear 54 meshes with another gear 55, the latter in turn meshing with a large gear 56 fast on the driving axle of the machine, the power of the machine being thus delivered to the driving wheels 5. When the clutch is operated through the medium of the thumb latch lever 49 to lock the gear 54 upon the shaft 28, motion will be imparted to the drive wheels 5 for the purpose of propelling the vehicle. When the wheel 54 is released, no motion is imparted to the vehicle, but the shaft 28 and the wheel 34 may continue to rotate, so that power derived therefrom may be belted off to any suitable machine.

The invention is susceptible of various changes in its form, proportions and minor details of construction and the right is reserved to make such changes as properly fall within the scope of the appended claim.

I claim:—

The combination of a wheeled truck having a rear driving axle, driving wheels on said axle, a gear fast on said axle, a portable engine supported on said platform and demountable therefrom and having its shaft arranged directly over the driving axle, a gear normally loose on the engine shaft in vertical alinement with the gear on the axle, another gear interposed between the gear on the engine shaft and the gear on the driving axle, said gears being so arranged as to admit of the demounting of the portable engine from the truck, a combined belt and fly wheel fast on the engine shaft, and a clutch between said fly wheel and the gear on the engine shaft.

In testimony whereof I affix my signature.

GUST. KALLNER.